United States Patent
Schmidt, Jr.

[15] 3,703,743
[45] Nov. 28, 1972

[54] METHOD AND MEANS FOR RESTRAINING ANIMALS

[72] Inventor: Carl Oscar Schmidt, Jr., Cincinnati, Ohio

[73] Assignee: The Cincinnati Butchers' Supply Company, Cincinnati, Ohio

[22] Filed: Nov. 27, 1970

[21] Appl. No.: 93,160

[52] U.S. Cl. ................................................ 17/1 A
[51] Int. Cl. .............................................. A22b 1/00
[58] Field of Search ...................................... 17/1 A

[56] References Cited

UNITED STATES PATENTS

| | | |
|---|---|---|
| 1,058,509 | 4/1913 | Wiltmann ..................... 17/1 A |
| 811,958 | 2/1906 | Schmidt et al. ............... 17/1 A |
| 1,021,523 | 3/1912 | Hoeckelberg .................. 17/1 A |
| 3,051,984 | 9/1962 | Hlavacek et al. .............. 17/1 A |
| 3,599,276 | 8/1971 | Edwards ....................... 17/1 A |

*Primary Examiner*—Lucie H. Laudenslager
*Attorney*—J. Warren Kinney, Jr.

[57] ABSTRACT

A meat animal on foot enters the restrainer on a normally stationary horizontal floor hinged along one side edge. A retractable sloping side wall moves to support the belly; the floor drops to immobilize the animal for stunning then upon retraction of the side wall the animal slides down the now inclined floor in proper position for leg shackling and hoisting to a bleeding conveyor. The device is also ideally suited for use by veterianians in handling animals.

21 Claims, 4 Drawing Figures

PATENTED NOV 28 1972

INVENTOR
CARL OSCAR SCHMIDT, JR.

BY J. Warren Kinney Jr.
ATTORNEY

PATENTED NOV 28 1972

INVENTOR
CARL OSCAR SCHMIDT, JR.

BY Warren Kinney Jr.

ATTORNEY

METHOD AND MEANS FOR RESTRAINING ANIMALS

BACKGROUND OF THE INVENTION

According to an early U.S. Patent of Schmidt et al. U.S. Pat. No. 811,958, an animal walks into a knocking pen and remains standing on a normally stationary floor hinged along one side edge, while poised for stunning. Because of the fact that the animal remains on foot, restraint of the animal is insecure and permits considerable moving and jumping, thereby interfering with the aim or effective application of a stunning device to the head of the animal. As a result, stunning may often become an inhumane operation which not only tortures the animal, but interrupts the desired regularity of animal movement into the modern automated meat production system.

The knocking pen of the patent mentioned, provides for hinging of the supporting floor to a position of inclination whereby the animal may slide partly out of the pen after stunning; however, the arrangement is such that the legs of the animal are inaccessible for easy shackling and hoisting to an overhead bleeding conveyor as used in modern packing plants. Under the teaching of the patent, it appears necessary to roll the half-ton carcass over in order to remove it from the pen and poise it for hoisting by the leg. Unless this is done, the side flap of the pen evidently would interfere with hoisting.

In view of the foregoing observations, the patented structure is subject to much improvement if it is to serve as a component of an automated line of meat processing machinery.

Other forms of restraining devices are disclosed by U.S. Patents such as U.S. Pat. Nos. 2,912,715 and 3,051,984, which require an excessive amount of floor space and considerable electric power. Also in devices of this type, the animal if frightened may run through the restrainer before the operator can contract the restraining side walls, in which event there is produced serious interference with the timed operation of the plant, and confusion resulting from an animal on the run.

SUMMARY OF THE INVENTION

The restraining means of the present invention is compact and reliable in its operation, and incorporates a minimum number of moving parts none of which are of a delicate nature. In operation, the apparatus presents a stationary floor for the animal to stand upon so as not to arouse undue excitement. At the convenience of the operator, and without risk of error, the operator may cause sloping side walls of the apparatus to support the animal at its belly while lowering the floor, thereby assuring complete immobility and control of the animal in readiness for stunning with great accuracy and effectiveness. After the stunning operation, a side wall of the apparatus is retracted to release the animal in such a way as to ensure its delivery always feet first, so that a leg shackle may be quickly and easily applied for hoisting the animal to an overhead bleeding conveyor.

The features and objectives mentioned in the preceding paragraph are objects of the present invention.

A further object of the invention is to ensure humane treatment of the animals by maintaining maximum control over their movements so that the stunner may work with precision and despatch.

Another object of the invention is to provide apparatus of the character stated which is limited in size, and is relatively simple, inexpensive, durable and free of maintenance attention.

Another object of the invention is to provide a restraining device and method whereby the hides and flesh of animals treated will not be defaced or bruised.

The foregoing and other objects are attained by the means described herein and illustrated upon the accompanying drawings.

DETAILED DESCRIPTION

Figure 1:
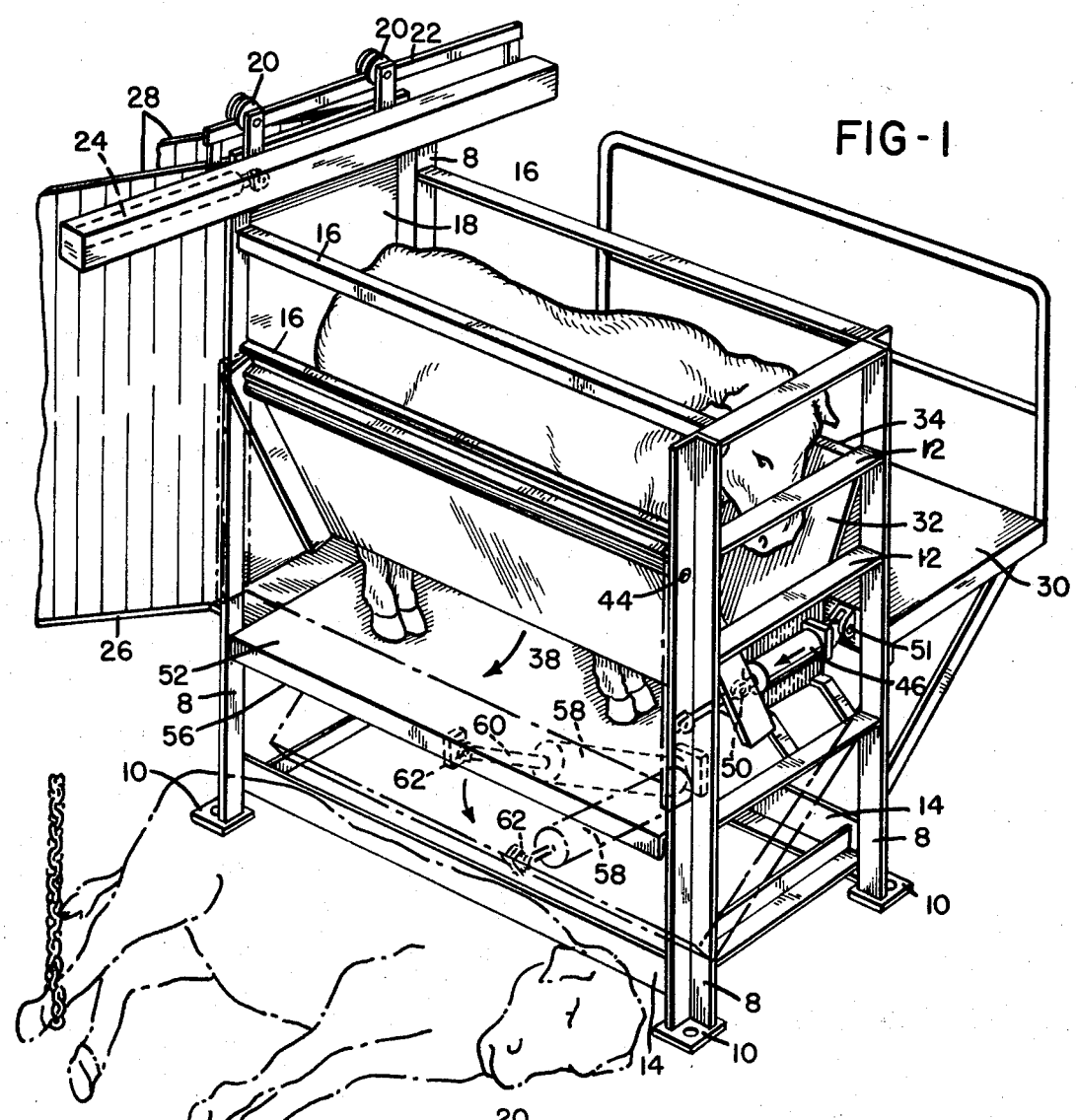
FIG. 1 is a perspective view of the improved restraining apparatus of the invention, showing an animal before and after stunning.

The device of the invention comprises a rectangular frame having four vertical corner posts 8 including feet or pads 10 whereby the frame may be secured to a suitable foundation. The frame may be reinforced at one of its ends by a series of struts 12, and at its sides by lower rails 14 and upper rails 16. At the entry end of the frame is located a suitable sliding gate 18 which is opened to admit an animal, and then closed to prevent the animal from backing out of the confines of the frame. Gate 18 may include a pair of hangers with wheels 20 adapted to ride along an elevated rail or track 22, to open and closed gate positions. The gate may be moved in any suitable manner such as, by way of example, by means of a pneumatic cylinder 24. A runway 26 having spaced parallel upright walls 28, 28 guides the animals to the entrance opening at gate 18.

At one side of the restrainer frame is mounted a suitable platform 30, which is disposed at a proper elevation to support an attendant armed with a stunning tool with which the attendant may disable the animal. The platform may or may not be attached to the frame, as desired.

Figure 3:
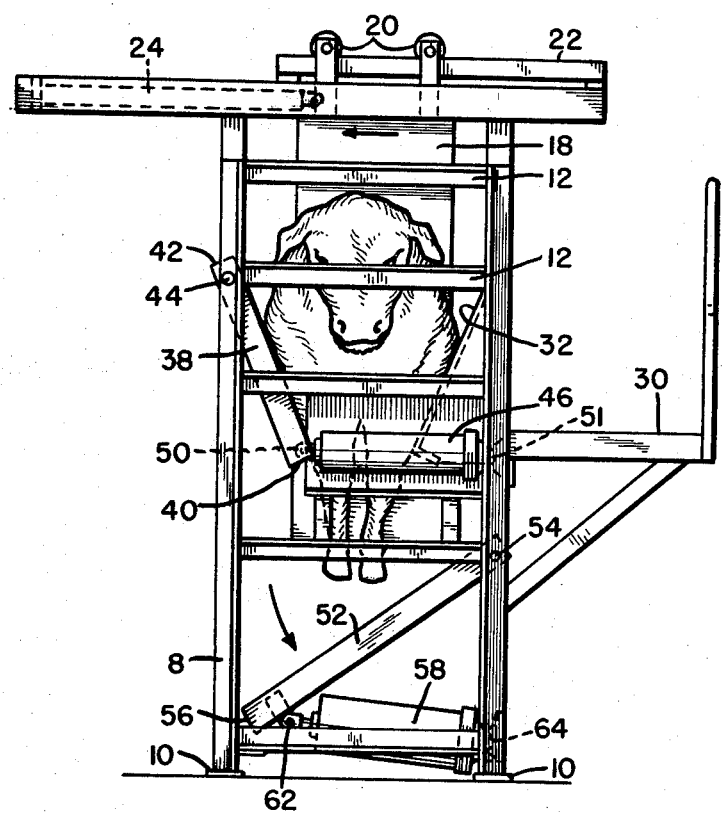
FIG. 3 is a view similar to FIG. 2, showing the animal under full restraint preparatory to stunning.

The platform side of the apparatus frame supports a heavy rigid downwardly and inwardly inclined wall or panel member 32 which may extend approximately the full length of the frame. Member 32 is stationary, and has an upper edge 34 located at approximately the shoulder height of an animal supported within the frame. The lower edge 36 of wall member 32 depends to a location near or above the animal's knees, where the wall member will provide support for one side of the belly of the animal, FIG. 3.

The opposite side of the belly of the animal is to receive support from a second panel or wall member 38, having a lower edge portion 40 disposed at the approximate level of edge 36 of member 32. Wall member 38 has an upper edge portion 42 supported by a horizontal pivot shaft 44, said shaft having its opposite ends supported by two of the frame corner posts. Wall member 38 is swingable about pivot shaft 44 from the operative or supportive position of FIG. 3, to the inoperative or free position of FIG. 4.

Any suitable power means may be employed for activating the movable wall or support member 38. As shown herein by way of example, the power means comprises a fluid motor in the form of a pneumatic or hydraulic cylinder 46, whose piston rod 48 has a pivotal connection at 50 with the lower edge portion of member 38. The fluid motor if desired, may be of the single-acting type wherein fluid power is utilized to retract the piston rod 48, and the weight of the wall member 38 with the animal supported thereon, acts to extend the piston rod. Of course, the fluid motor could be of the double-acting type, and may be supported on the frame at 51.

Figure 2:
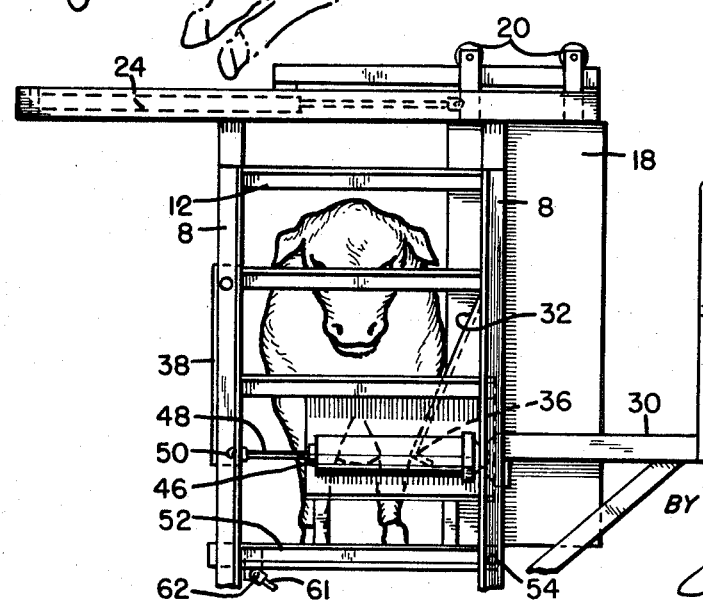
FIG. 2 is an end elevational view showing an animal as initially introduced into the apparatus.

The reference numeral 52 denotes a floor member of sufficient strength and rigidity to support the weight of an animal according to FIGS. 1 and 2. The floor member approximates in size the length and width dimensions of the apparatus frame. At 54 is located a pivot shaft for swingingly mounting one side edge of the floor member upon two of the frame corner posts. The opposite side edge 56 is free to swing in a circle arc about pivot 54.

Any suitable power means may be employed for activating the movable floor member 52. As herein suggested, said power means may comprise a fluid motor in the form of a pneumatic or hydraulic cylinder 58, whose piston rod 60 has pivotal connection at 62 with the floor member near its side edge 56. The cylinder is pivotally mounted upon the framework at 64.

The fluid motor 58 if desired, may be of the single-acting type wherein fluid power is utilized to project the piston rod 60, and the weight of the floor member with the animal thereon serves to retract the piston rod. The movements referred to are to be under the control of the attendant. Of course, the fluid motor 58 could be of the double-acting type if desired.

Figure 4:
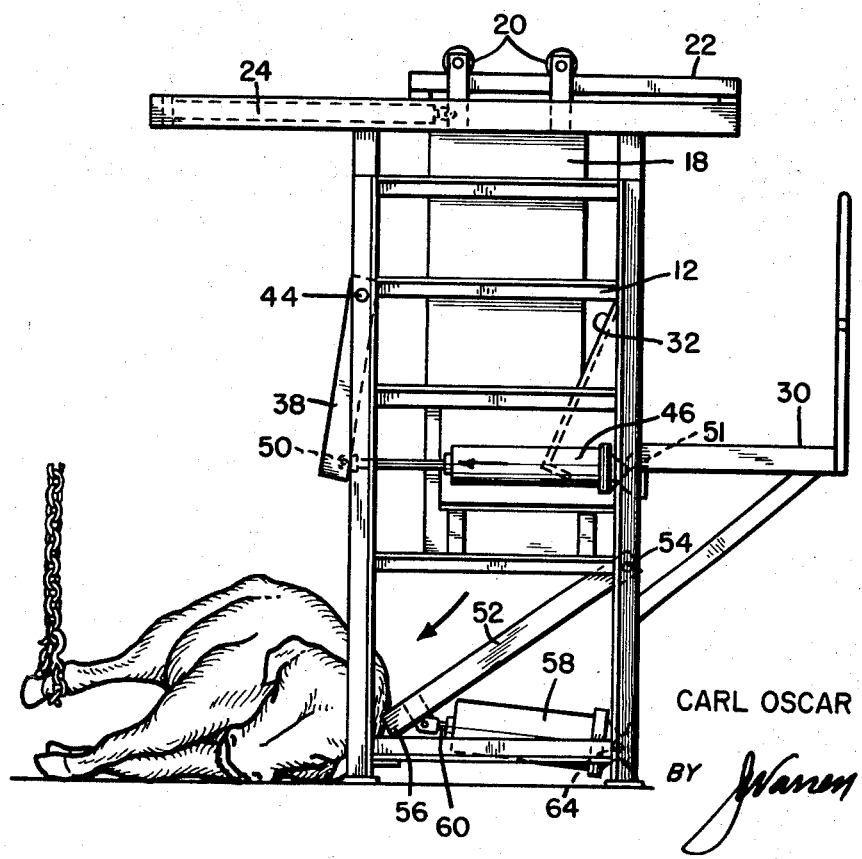
FIG. 4 is a view similar to FIG. 3, showing a side wall withdrawn and the floor inclined, to deliver the stunned animal feet first for easy shackling.

From the foregoing explanation, it will readily be appreciated that floor or support member 52 is disposable between an elevated, operative horizontal position to support the weight of an animal, and a lowered, inoperative, inclined or sloping position at which the animal is slidingly discharged from the apparatus, (FIG. 4). Moreover, floor member 52 may be caused to assume the inoperative position while the weight of the animal is supported solely by the inclined walls 32 and 38 according to FIG. 3, for immobilizing the animal prior to stunning.

OPERATION OF THE DEVICE

In the normal condition of the device, the floor member 52 is elevated to the operative horizontal position by the action of cylinder 58, and movable wall member 38 is lowered to the inoperative position remote from the stationary wall member 32. Also, the gate 18 stands open to permit entry of an animal on foot ascending the runway 26.

An animal passing the open gate 18 stands momentarily upon floor member 52, whereupon an attendant opens fluid pressure control valve means to activate motors 24 and 46 for closing gate 18 and advancing the wall member 38 against one side of the animal according to FIG. 1. The sloping wall member 38 cooperates with the fixed correspondingly sloping wall member 32, to support the weight of the animal at its belly, whereupon the operator will effect actuation of cylinder 58 for dropping the floor member under the feet of the animal to render it completely helpless and immobile. The operator may then apply the stunning tool with great accuracy and despatch to preclude any possibility of suffering.

To release the stunned animal, the operator need only manipulate a valve associated with cylinder 46, to displace wall member 38 to the inoperative position of FIG. 4. Due to the slope of fixed wall 32 and that of floor member 52 in a common direction, the released animal will slide down the face of member 52 to the exterior of the framework, with its legs extended automatically for application of a shackle 68 whereby the carcass may be hoisted to an overhead bleeding conveyor.

The device is made ready for a subsequent similar operation, by merely activating the fluid motors 58 and 24 to elevate the floor member 52 and open the gate 18. By means of the present method and apparatus, the desired operation is performed quickly, accurately, and without any loss of time, thereby to maintain a predetermined uninterrupted progression of animals through the processing plant. Such regularity in operation of the plant is of course conducive to profitable performance, with substantial savings of time and labor.

The device of the invention is very rugged and compact, utilizes a minimum of power, and its simplicity of construction is conducive to trouble-free inexpensive operation characterized by great reliability and efficiency.

What is claimed is:

1. Apparatus for restraining animals subject to stunning, said apparatus comprising in combination: an animal enclosing frame having an entrance opening through which an animal on foot may enter the frame interior; a floor member to receive and support the animal on foot and being displaceable to a lowered sloping position; a pair of opposed side wall members at opposite sides of said floor member and operative to engage and support the animal at the sides of its belly, upon displacement of the floor member to a lowered sloping position with one side of the floor member lower than the other side thereof and free of contact with the feet of the animal, thereby to poise the animal in a substantially upright and immobile position for stunning; and means for effecting displacement of the side wall member adjacent said one side of the floor member away from said animal and out of supporting engagement therewith, for release of the stunned animal onto said lowered sloping floor member and discharge of the animal laterally from the interior of the frame, with its feet emerging in advance of the body to facilitate shackling of a leg for hoisting the animal to an overhead conveyor.

2. The combination as defined by claim 1, wherein the disposition of the side wall member adjacent the other side of the floor member is such as to cooperate with the lowered sloping floor member to ensure discharge of the stunned animal laterally from the interior of the frame, with its feet emerging in advance of the body, to facilitate shackling of a leg for hoisting the animal to an overhead conveyor.

3. The combination as defined by claim 2, wherein said displaceable floor member is normally stationary.

4. The combination as defined by claim 2, wherein said displaceable floor member is stationary while the feet of the animal rest thereon.

5. The combination as defined by claim 2, wherein said displaceable floor member is stationary during displacement of said one side wall member to release the stunned animal.

6. The combination as defined by claim 2, wherein said displaceable floor member is stationary while the animal on foot enters the frame interior.

7. The combination as defined by claim 1, wherein is included power means operative by an attendant to control the movements of said floor member and said one side wall member.

8. The combination as defined by claim 7, wherein said displaceable floor member is stationary while the animal is poised for stunning.

9. The combination as defined in claim 1, wherein said displaceable floor member is normally stationary.

10. The combination as defined by claim 1, wherein said floor member has a longitudinal edge portion hinged upon the frame for arcuate swinging movement of the floor member when displaced, with the floor member disposed at a position of inclination to the vertical; and means under the control of an operator, for moving said floor member from said inclined position to the animal on-foot receiving and supporting position aforesaid.

11. The combination as defined by claim 10, wherein the side wall member adjacent said one side of the floor member has an upper edge portion hinged to the frame for swinging movement of its lower edge toward and from the remaining side wall member; and means under the control of an operator, for moving the hinged side wall member for advancement of the lower edge thereof toward said remaining side wall member.

12. The combination as defined by claim 11, wherein said remaining side wall member includes a lower edge disposed at substantially the level of the lower edge of said hinged side wall member when the latter wall member is in the position of advancement aforesaid.

13. The combination as defined by claim 12, wherein said remaining side wall member is immovably fixed to said frame at an inclination to the vertical, with the lower edge thereof disposed within the frame limits; and the hinged edge portion of the floor member is located beneath said remaining side wall member, the inclination of said remaining side wall member being in the general direction of the floor member inclination when said floor member is displaced.

14. The combination as defined by claim 13, wherein both of said means controlled by an operator, are fluid pressure actuated.

15. The method of restraining an animal for stunning, which comprises the steps of: driving the animal on foot onto a displaceable but normally stationary substantially horizontal floor member; then applying lateral support to the sides and the belly of the animal to limit downward gravitation of the animal; then displacing said floor member from supporting engagement with the feet of the animal with one side of said floor member lower than the other to transfer the weight of the animal from said floor member to said lateral support, thereby to disable the animal and poise it for stunning; then after stunning, removing said lateral support for gravity release of said animal onto said displaced floor member and discharge of the animal laterally from said floor member with its feet emerging in advance of the body to facilitate shackling of a leg of the animal.

16. The method as defined by claim 15, wherein the floor member as displaced is inclined, to form a chute located to receive the released animal on its side, and slidingly convey said animal with its feet advanced into position for shackling of at least one leg thereof.

17. The method as defined by claim 16, wherein the animal while standing upon the floor member, is restrained against movement in the forward direction of travel.

18. The method as defined by claim 16, wherein the animal standing upon the floor member while said floor member is stationary, is restrained against movement in a generally forward direction of travel.

19. The method as defined by claim 15, wherein the animal while standing upon the floor member, is restrained against movement in the forward and rearward directions of travel.

20. The method as defined by claim 15, wherein the animal standing upon the floor member while said floor member is stationary, is restrained against movement in a forward direction of travel.

21. The method as defined by claim 15, wherein the animal standing upon the floor member while said floor member is stationary, is restrained against movement in a rearward direction of travel.

* * * * *